US009098351B2

(12) United States Patent
Bell, Jr. et al.

(10) Patent No.: US 9,098,351 B2
(45) Date of Patent: *Aug. 4, 2015

(54) ENERGY-AWARE JOB SCHEDULING FOR CLUSTER ENVIRONMENTS

(71) Applicant: International Business Machines Corporation, Armonk, NY (US)

(72) Inventors: Robert H. Bell, Jr., Raleigh, NC (US); Luigi Brochard, Paris (FR); Donald R. DeSota, Liberty Hill, TX (US); Rajendra D. Panda, Austin, TX (US); Francois Thomas, Alencon (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,232

(22) Filed: Nov. 19, 2013

(65) Prior Publication Data

US 2014/0075448 A1    Mar. 13, 2014

Related U.S. Application Data

(63) Continuation of application No. 12/917,421, filed on Nov. 1, 2010, now Pat. No. 8,612,984.

(30) Foreign Application Priority Data

Apr. 28, 2010    (EP) .................................... 10305449

(51) Int. Cl.
*G06F 9/46*    (2006.01)
*G06F 9/50*    (2006.01)

(52) U.S. Cl.
CPC ............. *G06F 9/5094* (2013.01); *Y02B 60/142* (2013.01)

(58) Field of Classification Search
CPC ..................................................... G06F 9/5005
See application file for complete search history.

(56) References Cited

U.S. PATENT DOCUMENTS

| | | | |
|---|---|---|---|
| 5,745,375 | A | 4/1998 | Reinhardt et al. |
| 6,574,104 | B2 | 6/2003 | Patel et al. |
| 6,795,928 | B2 | 9/2004 | Bradley et al. |
| 6,829,713 | B2 | 12/2004 | Cooper et al. |
| 6,990,593 | B2 | 1/2006 | Nakagawa |
| 6,993,571 | B2 | 1/2006 | Kistler |
| 7,197,433 | B2 | 3/2007 | Patel et al. |

(Continued)

OTHER PUBLICATIONS

"U.S. Appl. No. 12/647,105 Office Action", Mar. 14, 2012, 10 pages.

(Continued)

*Primary Examiner* — Camquy Truong
(74) *Attorney, Agent, or Firm* — DeLizio Law, PLLC (57) ABSTRACT

A job scheduler can select a processor core operating frequency for a node in a cluster to perform a job based on energy usage and performance data. After a job request is received, an energy aware job scheduler accesses data that specifies energy usage and job performance metrics that correspond to the requested job and a plurality of processor core operating frequencies. A first of the plurality of processor core operating frequencies is selected that satisfies an energy usage criterion for performing the job based, at least in part, on the data that specifies energy usage and job performance metrics that correspond to the job. The job is assigned to be performed by a node in the cluster at the selected first of the plurality of processor core operating frequencies.

18 Claims, 5 Drawing Sheets

(56) References Cited

U.S. PATENT DOCUMENTS

| | | | |
|---|---|---|---|
| 7,272,735 | B2 | 9/2007 | Fung |
| 7,373,268 | B1 | 5/2008 | Viredaz et al. |
| 7,426,453 | B2 | 9/2008 | Patel et al. |
| 7,447,920 | B2 | 11/2008 | Sharma et al. |
| 7,590,873 | B2 | 9/2009 | Takahashi et al. |
| 7,783,909 | B2 | 8/2010 | Hatasaki et al. |
| 8,127,298 | B2 | 2/2012 | Kato et al. |
| 8,271,807 | B2 | 9/2012 | Jackson |
| 2003/0056132 | A1* | 3/2003 | Yatsuda et al. ............... 713/320 |
| 2003/0193777 | A1 | 10/2003 | Friedrich et al. |
| 2004/0194087 | A1 | 9/2004 | Brock et al. |
| 2005/0013705 | A1 | 1/2005 | Farkas |
| 2005/0096797 | A1 | 5/2005 | Matsubara et al. |
| 2005/0251802 | A1 | 11/2005 | Bozek et al. |
| 2006/0112286 | A1 | 5/2006 | Whalley et al. |
| 2006/0259621 | A1 | 11/2006 | Ranganathan |
| 2006/0288241 | A1 | 12/2006 | Felter et al. |
| 2007/0074011 | A1 | 3/2007 | Borkar et al. |
| 2007/0260417 | A1 | 11/2007 | Starmer et al. |
| 2008/0014104 | A1 | 1/2008 | Huang et al. |
| 2008/0141048 | A1 | 6/2008 | Palmer et al. |
| 2008/0234873 | A1 | 9/2008 | Gorbatov et al. |
| 2009/0106571 | A1 | 4/2009 | Low et al. |
| 2009/0125737 | A1 | 5/2009 | Brey et al. |
| 2009/0222562 | A1 | 9/2009 | Liu et al. |
| 2009/0235042 | A1 | 9/2009 | Petrocelli |
| 2009/0240964 | A1 | 9/2009 | Pfeiffer |
| 2009/0259345 | A1 | 10/2009 | Kato et al. |
| 2009/0265568 | A1 | 10/2009 | Jackson |
| 2009/0300210 | A1 | 12/2009 | Ferris |
| 2010/0100254 | A1 | 4/2010 | Artman et al. |
| 2010/0161282 | A1 | 6/2010 | Bell et al. |
| 2010/0162216 | A1 | 6/2010 | Bell et al. |
| 2010/0306354 | A1 | 12/2010 | Dehaan et al. |
| 2011/0119672 | A1 | 5/2011 | Ramaraju et al. |
| 2011/0154348 | A1 | 6/2011 | Elnozahy et al. |
| 2011/0161696 | A1 | 6/2011 | Fletcher |
| 2011/0271283 | A1 | 11/2011 | Bell, Jr. et al. |
| 2012/0030356 | A1 | 2/2012 | Fletcher |
| 2012/0216205 | A1 | 8/2012 | Bell, Jr. et al. |

OTHER PUBLICATIONS

"U.S. Appl. No. 12/847,116 Final Office Action", Mar. 6, 2013, 20 pages.
"U.S. Appl. No. 12/847,116 Office Action", Oct. 1, 2012, 16 pages.
"U.S. Appl. No. 12/917,421 Final Office Action", Apr. 5, 2013, 21 pages.
"U.S. Appl. No. 12/917,421 Office Action", Sep. 13, 2012, 19 pages.
"U.S. Appl. No. 13/458,860 Office Action", Sep. 20, 2012, 20 pages.
Bash, Cullen et al., "Data center workload placement for energy efficiency", ASME Conference Proceedings ASME, vol. 2007, No. 33129 Dec. 1, 2007, pp. 437-446.
Durani, Vineeta, "IBM Unveils Plan to Combat Data Center Energy Crisis; Allocates $1 Billion to Advance "Green" Technology and Services", http://www-03.ibm.com/press/us/en/pressrelease/21524.wss (Obtained from the Internet on Nov. 12, 2009) May 10, 2007, 6 pages.
Energy Vortex, , "HP Announces "Smart" Cooling Solution for Data Centers", http://www.energyvortex.com/pages/headlinedetails.cfm?id=701&archive=1 (Obtained from the Internet on Nov. 11, 2009) No publication date found. , 2 pages.
Fichera, Richard et al., "Power and Cooling Heat Up the Data Center", http://www.forrester.com/Research/Document/Excerpt/0,7211,38746,00.html (Obtained from the Internet on Nov. 12, 2009) Mar. 8, 2006, 2 pages.
Gartner, Inc. "Gartner Says a Green Data Centre Means More than Energy Efficiency", http://www.gartner.com/it/page.jsp?id=781012&format=print (Obtained from the Internet on Nov. 12, 2009) Oct. 20, 2008, 2 pages.
IBM, , "Data Center Power Management Enhancement for Energy Efficiency", May 4, 2009, 3 pages.
IBM, , "Dynamic Thermal Mapping and Trend Analysis as a Control Mechanism for HVAC Systems in Data Centers", Mar. 27, 2006, 3 pages.
IBM, , "Energy efficient cooling system for Data Center", Apr. 23, 2009, 4 pages.
IBM, , "Item location using a programmable RFID Tag location device", http://www.priorartdatabase.com/IPCOM/000160360/ (Obtained from the Internet on Nov. 11, 2009) No publication date found. , 2 pages.
IBM, , "Software as a Service (SaaS)", -304.ibm.com/jct01005c/isv/marketing/saas/index.html (Obtained from the Internet on Nov. 11, 2009) No publication date found. , 2 pages.
Jeong, et al., "Workload Placement Models: Workload Placement Algorithm that maximizes the uniformity of the temperatures of a DC", nsfcac.rutgers.edu/greencomputing/workshop/presentations/gc-workshop-myong.pdf (Obtained from the Internet on Nov. 11, 2009) 2009, 1 page.
Karabuto, Alex , "HDD Diet 2: Power Consumption and Heat Dissipation of Enterprise Hard Disk Drives", http://ixbtlabs.com/articles2/storage/hddpower-pro.html (Obtained from the Internet on Nov. 11, 2009) Mar. 2, 2006, 15 pages.
Karabuto, Alex , "HDD Diet: Power Consumption and Heat Dissipation", http://ixbtlabs.com/articles2/storage/hddpower.html (Obtained from the Internet on Nov. 11, 2009) Jul. 11, 2005, 16 pages.
Microsoft, , "Win32_DiskDrive Class", http://msdn.microsoft.com/en-us/library/aa394132(VS.85).aspx (Obtained from the Internet Nov. 11. 2009) Nov. 3, 2009, 14 pages.
Nsharma, , "Script to retrive table statistics", ibm.com/developerworks/blogs/page/nsharma?entry=script_to_retrive_table_statistics (Obtained from the Internet on Nov. 11, 2009) Dec. 15, 2008, 1 page.
Patel, D. , "Storage File Mapping in Databases", parallelprose.com/parallelprose/white_papers/veritas_File_Mapping.pdf (Obtained from the Internet on Nov. 11, 2009) Apr. 22, 2003, 11 pages.
Patterson, Michael K. , "The effect of data center temperature on energy efficiency", http://www.eco-info.org/IMG/pdf/Michael_K_Patterson_-_The_effect_of_Data_Center_Temperature_on_Energy_Efficiency.pdf (Obtained from the Internet on Nov. 13, 2009) Jan. 1, 2008, pp. 1167-1174.
Rosenberg, David , "IBM takes to Amazon's EC2 cloud", http://news.cnet.com/8301-13846_3-10161864-62.html (Obtained from the Internet on Nov. 11, 2009) Feb. 11, 2009, 2 pages.
Shah, Amip J. et al., "Exergy analysis of data center thermal management systems", ASME Conference Proceedings ASME, vol. 2003, No. 37084 Dec. 1, 2003, pp. 437-446.
Srikantaiah, "Energy Aware Consolidation for Cloud Computing", Nov. 14, 2008, 9 pages.
Tang, Qinghui et al., "Thermal Aware Task Scheduling for Datacenters through Minimizing Heat Recirculation", Sep. 2007, pp. 129-138.
The Engineering Tool Box, , "Fans—Efficiency and Power Consumption", .engineeringtoolbox.com/fans-efficiency-power-consumption-d_197.html (Obtained from the Internet on Nov. 11, 2009) 2005, 3 pages.
Weston, Rusty , "Greening the Data Center", http.smartenterprisemag.com/articles/2008winter/markettrends2.jhtml (Obtained from the Internet on Nov. 11, 2009) No publication date found. , 2 pages.
Willeford, Timothy et al., "IBM Project Big Green Tackles Global Energy Crisis", http://www-03.ibm.com/press/us/en/pressrelease/24395.wss (Obtained from the Internet on Nov. 12, 2009) Jun. 11, 2008.

* cited by examiner

ENERGY-AWARE JOB SCHEDULING FOR CLUSTER ENVIRONMENTS

RELATED APPLICATIONS

This application is a continuation application that claims the benefit of U.S. patent application Ser. No. 12/917,421 filed Nov. 1, 2010.

This invention was made with Government support under contract HR0011-07-9-0002 awarded by Defense Advanced Research Projects Agency (DARPA). The Government has certain rights to this invention.

BACKGROUND

Embodiments of the inventive subject matter generally relate to the field of energy conservation aware computing, and, more particularly, to energy-aware job scheduling for cluster environments.

Managing power consumption has become a serious concern to many high performance computing (HPC) data centers where large clusters are used for running parallel applications. The performance characteristics of a parallel application can range from processor intensive to memory bandwidth intensive. These performance characteristics affect power consumption. The Active Energy Manager (AEM) tool provides a comprehensive view of energy consumption in a data center. The AEM tool measures, monitors, and manages energy components built into systems. The AEM tool measures and monitors components by collecting power information of devices plugged into a power distribution unit. The AEM tool manages energy components with power capping and power savings mode.

SUMMARY

Embodiments include a method and a computer program product that access data that specifies energy usage and job performance metrics that correspond to a job and a plurality of processor core operating frequencies. The job has been requested of a cluster. A first of the plurality of processor core operating frequencies is selected that satisfies an energy usage criterion for performing the job based, at least in part, on the data that specifies energy usage and job performance metrics that correspond to the job. The job is assigned to be performed by a node in the cluster at the selected first of the plurality of processor core operating frequencies.

Embodiments include a computer program product for energy-aware job scheduling, which comprises a computer readable storage medium having computer readable program code embodied therewith. The computer readable program code comprises computer readable program code configured to evaluate energy usage and job performance metrics against an energy usage criterion for a job. The energy usage and job performance metrics correspond to the job at different ones of a plurality of processor core operating frequencies of a node in a cluster. The computer readable program code configured is also configured to select a first of the plurality of processor core operating frequencies based, at least in part, on evaluation of the energy usage and job performance metrics against the energy usage criterion for the job. The computer readable program code configured is further configured to assign the job to the node for performing the job at the first of the plurality of processor core operating frequencies.

Embodiments include an apparatus that comprises a processor, a network interface, and an energy aware job scheduler operable. The energy aware job scheduler is operable to evaluate energy usage and job performance metrics against an energy usage criterion for a job. The energy usage and job performance metrics correspond to the job at different ones of a plurality of processor core operating frequencies of a node in a cluster. The energy aware job scheduler is operable to select a first of the plurality of processor core operating frequencies based, at least in part, on evaluation of the energy usage and job performance metrics against the energy usage criterion for the job. The energy aware job scheduler is operable to assign the job to the node for performing the job at the first of the plurality of processor core operating frequencies.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to reducing frequencies of nodes in a cluster below a default processor core operating frequency, embodiments can increase the frequencies above the default processor core operating frequency. In other instances, well-known instruction instances, protocols, structures and techniques have not been shown in detail in order not to obfuscate the description.

The description herein uses the terms "job" and "node." The term "job" refers to a task or tasks performed by a node. Examples of a task include searching a database, updating a record(s) in a database, performing a computation(s), backing up data, compressing data, scanning data, analyzing data, etc. A node can perform a job with a variety of techniques include: executing a program or batch of programs, awakening an executing instance of a program(s) ("process"), passing a parameter(s) to a process, etc. The node may execute programs serially, in parallel, or a combination thereof. Processes may cooperate or coordinate with each other to perform a job or task of a job. The term "node" is used herein to refer to a computational entity within a group or cluster of nodes that can execute a program(s). Examples of a node include a core of a processor, a processor, an application specific integrated circuit, a blade server, etc.

Power management techniques react to current energy usage (e.g., by powering down nodes, scaling down frequencies, etc.) rather than proactively manage power use based on predicted energy usage for performing a job. The predicted energy usage is based on energy usage and performance data collected prior to performing the job. When a job scheduler receives a job, the job scheduler determines whether the requested job (or a similar job) has been previously performed by one or more nodes in a cluster. If the job has been performed previously, the job scheduler (or an entity that can communicate with the job scheduler) retrieves actual energy usage (e.g., watts consumed) and actual job performance data (e.g., time to completion) for the previously performed job. The job scheduler can also retrieve or generate estimated energy usage and/or job performance data at different processor core operating frequencies of a node(s) in the cluster. The job scheduler can analyze the energy usage and job performance data to determine a processor core operating frequency for performing the job while conserving energy. A job criterion, (e.g., a policy that governs the job) may also influence selection of the processor core operating frequency to satisfy the criterion. The job scheduler assigns the job to one or more nodes in the cluster to be performed at the determined processor core operating frequency.

Figure 1:
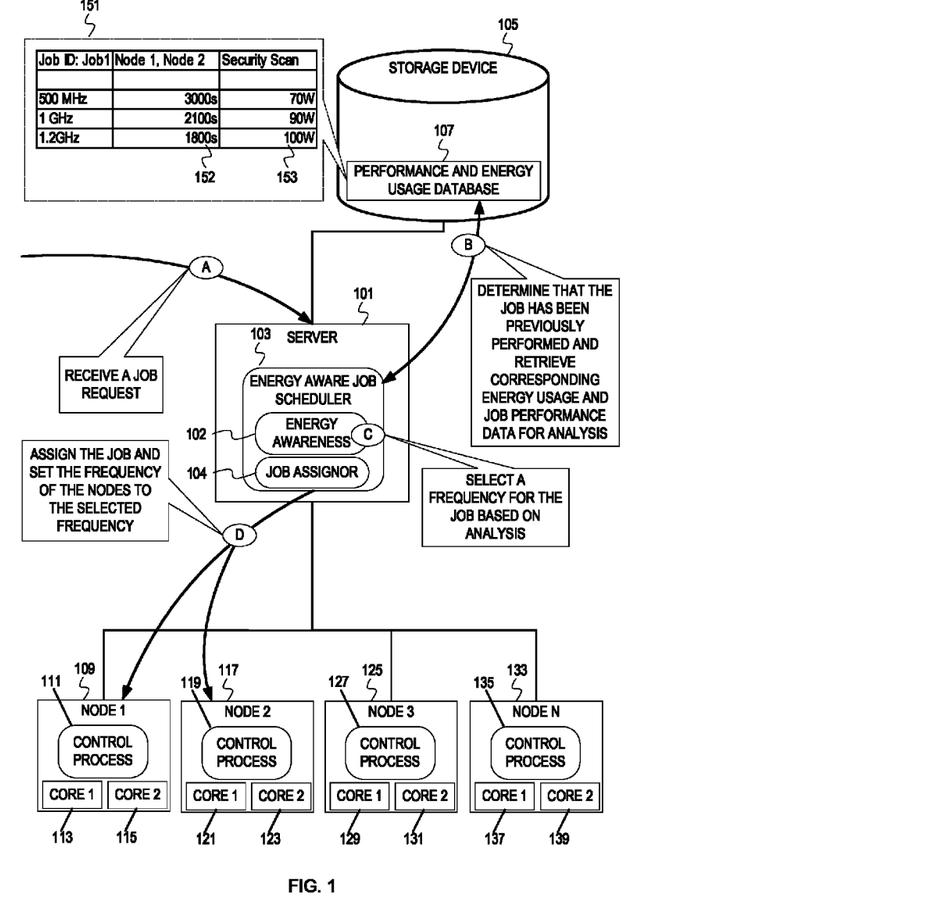
FIG. 1 depicts an example conceptual diagram of a system for selecting frequencies to perform jobs based on energy usage and performance metrics.

FIG. 1 depicts an example conceptual diagram of a system for selecting frequencies to perform jobs based on energy usage and performance metrics. The system includes a cluster comprising four nodes—node 1 109, node 2 117, node 3 125, and node N 133. The nodes 109, 117, 125, and 133 respectively comprise control processes 111, 119, 127, and 135, and further comprise cores 1 113, 121, 129, and 137, respectively and cores 2 115, 123, 131, and 139, respectively. The cores 1 113, 121, 138 and 137 and cores 2 115, 123, 131, and 139 can operate at multiple processor core operating frequencies. An initial/default processor core operating frequency is specified for the cores 1 113, 121, 138 and 137 and cores 2 115, 123, 131, and 139. For example, oscillators associated with each of the nodes 109, 117, 125, and 133 provide output to control frequency of the cores 1 113, 121, 138 and 137 and cores 2 115, 123, 131. Initially, the frequency is a default processor core operating frequency. The default processor core operating frequency can be divided/multiplied to decrease/increase the frequency ("frequency scaling") of the cores 1 113, 121, 138 and 137 and cores 2 115, 123, 131, and 139. The frequencies can be varied within a certain operating range of the cores 1 113, 121, 138 and 137 and cores 2 115, 123, 131, and 139 and the division/multiplication of the default processor core operating frequency can be based on a certain factor. For example, the default processor core operating frequency of core 1 113 and core 2 115 is 4 GHz. The core 1 113 and core 2 115 can operate in the range of 2 GHz to 8 GHz. The default processor core operating frequency can be divided/multiplied by factors of 2, so supported frequencies for the core 1 113 and the core 2 115 are 2 GHz, 4 GHz, and 8 GHz. Embodiments are not limited to any of these example illustrations relating to processor core operating frequency. It should be appreciated that a variety of designs exist and are possible for cores, which could affect any one of the operating range, degree of frequency scaling, and mechanism for frequency scaling. For brevity, the description will refer to those frequencies that fall within an operating range of a core(s) or that are in accordance with a specification of a core(s) as "supported frequencies."

The cluster is associated with a server 101 that manages the cluster. The server 101 is connected to a storage device 105 that hosts a performance and energy usage database 107. The server 101 comprises an energy aware energy aware job scheduler 103 that assigns jobs to the nodes 109, 117, 125, and 133 based on analysis of energy usage and job performance data. The energy aware job scheduler 103 comprises an energy awareness module 102 and a job assignor 104. FIG. 1 depicts the energy aware job scheduler 103 as comprising the distinct modules (e.g., functions, procedures, routines, methods of a class, etc.) for illustrative purposes. Depicting the energy awareness module 102 conceptually illustrates the functionality for analyzing energy usage and job performance data, and selecting a processor core operating frequency accordingly. Depicting the job assignor 104 conceptually illustrates the functionality for assigning jobs to nodes in accordance with the operations/output of the energy awareness module 102. The names of the modules attempt to reflect the illustrated functionality of the modules within the limited space of the drawing sheet, and should not be used to limit embodiments. Embodiments can implement the code for an energy aware job scheduler in accordance with a variety of programming practices, programming styles, programming paradigms, etc. For example, the functionality can range from being more modular (e.g., separate modules retrieve data, analyze data, and select a processor core operating frequency) to not modular (e.g., a single routine/function/procedure performs all functionality). Furthermore, embodiments can implement one or more distinct programs. For example, separate programs can be implemented to analyze job performance and energy usage data and to select a processor core operating frequency. These separate programs can then communicate with a job scheduler to assign jobs in accordance with the analysis and selected processor core operating frequency.

Returning to FIG. 1, the energy aware job scheduler 103 selects one or more nodes to perform the job based on resources (e.g., amount of memory, network bandwidth, etc.) indicated for the job and availability of the nodes. The energy awareness module 102 determines a processor core operating frequency for the selected node(s) based on a job criterion (e.g., maximum run time, deadline for completing the job, etc.) and energy usage and performance data collected during a previous performance of the job. The energy aware job scheduler 103 also determines a processor core operating frequency based on a policy for the system (e.g., a monthly energy consumption policy for the overall system, a daily energy consumption limit per node in the system, etc.). The job assignor module 102 then assigns the job to the node(s). Assignment of a job to a node can be implemented with a variety of techniques. Examples of job assignment techniques include: transmitting an operation code to a listening process, which could be the control process, on the node; transmitting, to a control process on the node, a reference to a program to be executed, instantiating a control process on a management system, which could be the same system hosting the job scheduler, to remotely control a node to perform a job; using a remote procedure call; communicating a command message to a control process on the node; and forwarding a job descriptor to a node to be parsed by a control process on the node. The control processes 111, 119, 127, and 135 can be instances of a module(s) of the energy aware job scheduler 103, and may be locally instantiated. The code for the control processes 111, 119, 127, and 135 may be stored locally also (e.g., installed at each node, distributed from a remote management system, etc.). The control processes 111, 119, 127, and 135 can be utilized to collect energy usage and job performance data while jobs are being performed by the respective nodes 109, 117, 125, and 137. Embodiments can also collect energy usage and job performance data with other processes independent of the job scheduler. The collected energy usage and job performance data is stored in the performance and energy usage database 107. Prior to job assignment, coincident to job assignment, or prior to performing a job, a control process sets the processor core operating frequency to the processor core operating frequency selected by the job scheduler. For instance, the control processes 111, 119, 125, and 135 can utilize an application programming interface (API) to change the processor core operating frequency of the respective cores. Embodiments are not limited to an API, though. Embodiments can execute a proprietary script to adjust the processor core operating frequency, can set a value in hardware that adjusts the processor core operating frequency, etc.

At stage A, the energy aware job scheduler 103 receives a job. For example, the energy aware job scheduler 103 receives a job descriptor file specifying the programs to be executed and the resources that are necessary for the programs to execute. Included in the specified necessary resources may be, for example, an amount of memory, types of processors, storage space, software licenses, etc. A job request can originate from a plethora of sources. A job request may originate from an executing program that accepts information entered into a user interface by a user at a system that may or may not be the system that hosts the job scheduler. A job request may originate from a process that manages a list of job requests scheduled in advance. For example, a system administrator may schedule a backup job and virus scan job every Saturday at 3:00 am with a user interface of a job scheduling application. At 3:00 am on Saturday, a process associated with the scheduling application generates a job request. As another example, a user can enter information for a job request into a web browser interface and submit the information via a web browser. A process of an online service provider processes the information and generates a job request.

At stage B, the energy awareness module 103 accesses the database 107 to determine whether the job has been performed and to retrieve energy usage and job performance data that corresponds to the job. The energy awareness module 103 searches the performance and energy usage database 107 for an indication of the job (e.g., an identifier of the job, a job type or class, etc) responsive to receiving a job request. Inclusion in one or more records in the performance and energy usage database 107 indicates that the job has been previously performed in the cluster associated with the server 101. Embodiments are not limited to searching a database of job performance and energy usage data to determine whether a job has been previously performed. Embodiments can maintain various information in a structure(s) that indicates jobs previously performed including: a structure that indicates jobs performed in the cluster within a preceding time period; a structure that indicates the last n jobs performed; separate structures for different classes of jobs, each indicating the last n jobs of that class performed; etc.

An example record 151 from the database 107 is illustrated in FIG. 1 as indicating a job identifier, nodes that performed the job, job class, and job performance data and energy usage data at three different processor core operating frequencies. The example record 151 indicates a job identifier "Job1", nodes Node 1 and Node 2 as having performed Job1, and a job class "Security Scan." The record 151 indicates the three supported processor core operating frequencies as 500 MHz, 1 GHz, and 1.2 GHz. At 500 MHz, the job performance and energy usage data respectively specify 3000 seconds and 70 watts. At 1 GHz, the job performance and energy usage data respectively specify 2100 seconds and 90 watts. At 1.2 GHz, the job performance data and energy usage respectively specify 1800 seconds and 100 watts. Assuming that the requested job identifier is Job1, the energy awareness module 102 determines that the requested job has been performed previously. If the energy awareness module 102 determined that the requested job had not been previously performed by the cluster or had not been previously performed within a window of time, then, in response, the energy awareness module 102 can determine whether a similar job had been performed on the cluster based on the job request. Embodiments can implement a performance and energy usage database with more information, less information, or different information than depicted in the example record 151 of FIG. 1. Additional information can be used to determine a previously performed job as similar to a requested job. For example, the energy awareness module 102 can search the performance and energy database 107 for any one or more of a job type, job class, program names associated with the requested job, performance characteristics of the requested job (e.g., core intensive, memory intensive, I/O intensive, both I/O and core intensive, etc.). Embodiments can set a threshold or criterion for accepting an entry for a previously performed job as similar to the requested job (e.g., a minimum number of programs that match). Further, embodiments are not limited to determining that a job or similar job has been previously performed by a cluster with a performance and energy usage database. Embodiments can access other data, such as a log or job request history of operations, to determine whether a job or similar job has been previously performed.

In response to receiving the job request and determining that the job Job1 has been previously performed (or that Job1 is sufficiently similar to the requested job), the energy awareness module 102 retrieves energy usage and job performance data from the record 151. The energy usage and job performance data can comprise estimates of energy usage and job performance data for one or more of the supported frequencies of the nodes 109, 117. For example, the control processes 111 and 119 can utilize an energy use measuring/monitoring tool, such as the Active Energy Manager from IBM®, to determine the power consumed by the nodes 109 and 117, respectively. The energy awareness module 102 determines aggregate power consumption based on collecting the power consumption from the control processes 109 and 117. The energy awareness module 102 can also computes the completion time from the start time and end time of the job. The energy awareness module 102 can use the power consumption and completion time at 1.2 GHz to estimate power consumption and completion times at 1 GHz and 500 MHz on nodes 109, 117. Embodiments can replace estimated job performance and energy usage data with actual job performance and energy usage data if/when the job is performed at the other frequencies. For example, on a second performance of the job, the energy awareness module 102 selects 500 MHz to perform the job. During the second performance, the energy aware job scheduler 103 can determine actual energy usage and job performance. An energy use monitoring/measuring tool can update the energy usage and job performance data to include the actual energy usage and performance at 500 MHz. The energy awareness module 102 could then use the actual energy usage and job performance data at 500 MHz when selecting a process core operating frequency for future performance of the job.

At stage C, the energy awareness module 102 utilizes the energy usage and performance data to select a frequency to run the job according to a performance policy. The performance policy can be included in a job description file associated with the job. For example, if the performance policy indicates that energy consumption should be minimized without regard to application performance (e.g., completion time), the energy awareness module 102 selects the processor core operating frequency based on the lowest energy usage indicated in the energy usage data. As another example, if the performance policy indicates a minimum performance to be maintained while minimizing energy consumption, the energy awareness module 102 selects the processor core operating frequency associated with the lowest energy usage indicated in the energy usage data that corresponds to a performance indicated in the performance data that is greater than or equal to the specified minimum performance At stage D, the job assignor module 104 assigns the job to nodes in the cluster and sets the frequency of the nodes. In this example, the job assignor 104 assigns the job to the nodes 109 and 117 and instructs the control processes 111 and 119 to set the processor core operating frequencies of the cores 1 113 and 121 and cores 2 115 and 123 to the selected processor core operating frequency.

Figure 2:
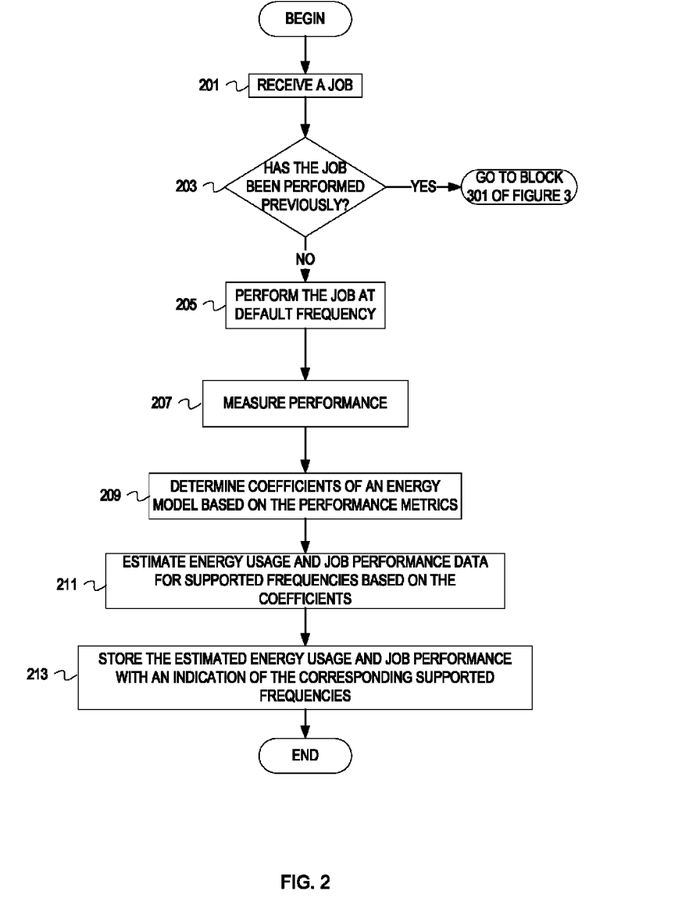
FIGS. 2 and 3 are flowcharts depicting example operations for selecting frequencies to run jobs based on energy usage and performance data.
Figure 3:
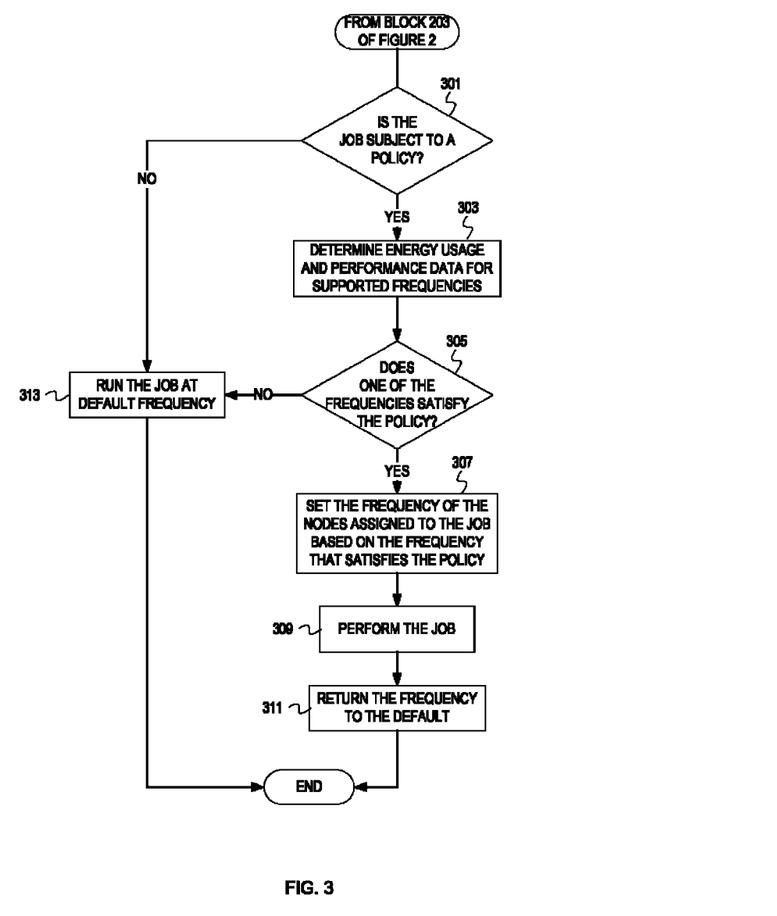

FIGS. 2 and 3 are flowcharts depicting example operations for selecting frequencies to run jobs based on energy usage and performance data. Flow begins at block 201, where a job is received for a cluster. For example, a user submits a job to the cluster using a host system's command line interface by typing a name of an executable file that indicates the job's tasks. As another example, a user submits a job through a management interface provided by the host system. The management interface allows the user to select tasks for the job and indicate task dependencies.

At block 203, it is determined if the job has been performed previously. Determining if the job has been performed previously can comprise searching a performance and energy usage database for a job identifier, searching the performance and energy usage database for similar jobs, etc. In addition, a job scheduler may also determine whether the job was performed within a certain preceding time period. If the job has not been performed previously, flow continues at block 205. If the job has been performed previously, flow continues at block 301 of FIG. 3.

At block 205, the job has not been performed previously, so the job is run at a default processor core operating frequency. The job can be performed at the default processor core operating frequency because At some previous time, benchmark tests are run at the default processor core operating frequency, for example when the cluster was configured. Performance metrics are measured during performance of the job (either a previous performance or the current performance) benchmark tests and compared against performance metrics from the benchmark tests so that an appropriate energy model is chosen for the job based on characteristics of the job. For example, different energy models can be chosen for computation intensive jobs and memory intensive jobs because power and energy usage of memories can be considered in addition to power and energy usage of processors for memory intensive jobs when determining overall power and energy usage. As another example, power and energy usage of network elements (e.g., network adapters, routers, hubs, etc.) could be considered in selecting an energy model for an input/output (I/O) intensive job.

At block 207, performance metrics are measured. Examples of performance metrics include giga-instructions per second (GIPS), memory bandwidth in gigabytes per second (GBS), translation lookaside buffer (TLB) misses, cycles per instruction (CPI), completion time, etc.

At block 209, coefficients of an energy model are determined based on the measured performance metrics. The coefficients can be determined from the performance and energy usage database based on the measured performance metrics of a benchmark test that most closely resembles the job (i.e., the characteristics of the job are similar to the characteristics of the benchmark test). For example, a record indicating the coefficients is located based on matching (within a certain range) benchmark test performance metrics with the job performance metrics.

At block 211, energy usage and performance for each of the supported frequencies is estimated based on the coefficients. For example, the power consumption for each of the supported frequencies are estimated based on Expression 1, below. In Expression 1, p represents estimated power consumption; a, b, and c, represent coefficients; and i=0, . . . ,n. The default processor core operating frequency is represented by n while the 0 to n−1 represent supported frequencies below the default processor core operating frequency. GIPS and GBS are example performance metrics discussed at block 207.

$$p_i = a_i \times \text{GIPS} + b_i \times \text{GBS} + c_i \qquad \text{Expression 1}$$

Performance for each supported frequency can be estimated based on Expression 2, below. The default processor core operating frequency is represented by $f_n$ while the $f_0$ to $f_{n-1}$ represent supported frequencies below the default processor core operating frequency, where i=0, . . . , n. $T_i$ represents estimated completion time for each supported frequency ($f_i$) and $T_n$ represents the completion time of the job at the default processor core operating frequency ($f_n$). $CPI_n$ represents a measured cycles per instruction of the job at $f_n$ and $CPI_i$ represents an estimated cycles per instruction at each $f_i$. Example performance metrics for $T_n$ and $CPI_n$ are discussed at block 207.

$$T_i = \frac{T_n \times f_n}{f_i} \times \frac{CPI_n}{CPI_i} \qquad \text{Expression 2}$$

Cycles per instruction at each supported frequency can be estimated based on Expression 3, below. The default processor core operating frequency is represented by n while the 0 to n−1 represent supported frequencies below the default processor core operating frequency where i=0, . . . , n. TPI represents transactions per instruction and $CPI_n$ represents a measured cycles per instruction at $f_n$, while d, e, and f represent coefficients. $TPI_n$ is an example performance metric discussed at block 207.

$$CPI_i = d_i \times CPI_n + a_i \times TPI_n + f_i \qquad \text{Expression 3}$$

Transactions per instruction at the default processor core operating frequency can be estimated based on Expression 4. The default processor core operating frequency is represented by $f_n$. GBS and $CPI_n$ are example performance metrics discussed at block 207, and cache_line_size represents a size of cache lines in an instruction cache.

$$TPI_n = \frac{GBS \times CPI_n}{\text{cache\_line\_size} \times f_n} \qquad \text{Expression 4}$$

Energy usage for each supported frequency can then be estimated based on multiplying the estimated completion times by the power consumptions at each supported frequency.

At block 213, the estimated energy usage and job performance data for each of the supported frequencies is stored with an indication of the corresponding supported frequency. The estimated energy usage and performance can be stored in the performance and energy usage database.

FIG. 3 is a flowchart, which continues from FIG. 2, depicting example operations for selecting frequencies to perform jobs based on energy usage and performance data. Flow continues from block 203 of FIG. 3 at block 301. The job has been performed previously, so it is determined if the job is subject to a policy. The policy can indicate performance and/or energy usage constraints for the job. For example, a policy may indicate that energy consumption should be minimized while keeping performance degradation within an indicated tolerance.

At block 303, energy usage and performance data is determined for the supported frequencies. The energy usage and performance data can be determined from the performance and energy usage database based on an identifier of the job. Estimates for energy usage and performance for each supported frequency were computed and stored for a previous performance of the job, or similar job.

At block 305, it is determined if one of the processor core operating frequencies satisfies the policy. For example, the policy specifies that energy usage should be reduced by 50 percent while completion time of the job should not increase more than 20 percent. The energy aware job scheduler can determine a processor core operating frequency of the supported frequencies with an estimated energy usage below 50 percent and an estimated completion time of less than 20 percent degradation based on the energy usage and performance data. If more than one frequency satisfies the policy, the job scheduler can chose the lowest satisfying frequency. If one of the frequencies satisfies the policy, flow continues at block 307. If none of the frequencies satisfy the policy, flow continues at block 313. Embodiments can also set frequencies across nodes or within nodes at different frequencies that satisfy the policy and reduce energy consumption. For example, a job scheduler can determine that energy consumption can be reduced while satisfying performance requirements with a lower frequency on a first node, a higher frequency on a second node, and both frequencies at a third node. In addition, embodiment can reconcile multiple policies and select processor core operating frequency(ies) to perform a job accordingly. For instance, embodiments can reconcile a job policy that specifies a threshold performance degradation of no more than 20% with a cluster policy that specifies a particular amount of energy consumption within a 24 hour period.

At block 307, the processor core operating frequency of the nodes assigned to the job is set based on the processor core operating frequency that satisfies the policy. For example, the job scheduler transmits instructions to control processes of the nodes that indicate the satisfying processor core operating frequency. In response, the control processes set the nodes to run at the satisfying frequency.

At block 309, the job is performed at the assigned nodes. For example, the job scheduler can perform any one of provide a reference indicating a location of code representing the job (or a task within the job) to the control processes; pass data to the control processes, etc. In response, the control processes initiate performance of the job on the assigned nodes. Actual performance and energy usage can be measured while the job is running. The job scheduler can store the actual performance and energy usage in the performance and energy usage database so that the actual performance and energy usage can be used for selecting frequencies for future performances of the job rather than the estimated performance and energy usage. In addition, the job scheduler can utilize an energy model to update estimates of other supported frequencies based on the actual performance and energy usage.

At block 311, the processor core operating frequency of the nodes assigned to the job is returned to the default processor core operating frequency. The frequency is returned to the default so that another job can be assigned to the node. Returning the processor core operating frequency of the nodes to default can comprise transmitting instructions, an opcode, command, flag, etc., to the control processes indicating that the nodes should run at the default processor core operating frequency. Embodiments are not limited to returning a core to the default processor core operating frequency. Embodiments can leave the processor core operating frequency unchanged, set the processor core operating frequency to the lowest processor core operating frequency, etc.

At block 313, the job was not subject to a policy or none of the processor core operating frequencies satisfied the policy, so the job is performed at default processor core operating frequency. Although the job can be performed at the default processor core operating frequency, embodiments are not limited to performing the job at the default processor core operating frequency. If the job was not subject to a policy, the job can be run at any processor core operating frequency. The job scheduler can determine the processor core operating frequency based on current/projected workloads, overall power usage of a cluster, etc. If none of the processor core operating frequencies satisfied the policy, the job may be run at a frequency that best satisfies the policy.

Although embodiments refer to performing jobs at different frequencies, embodiments are not so limited. In some embodiments, other energy reduction techniques (e.g., memory throttling, powering down peripherals associated with the nodes that will not be used for a job, etc.) can be utilized in addition to frequency scaling.

Figure 4:
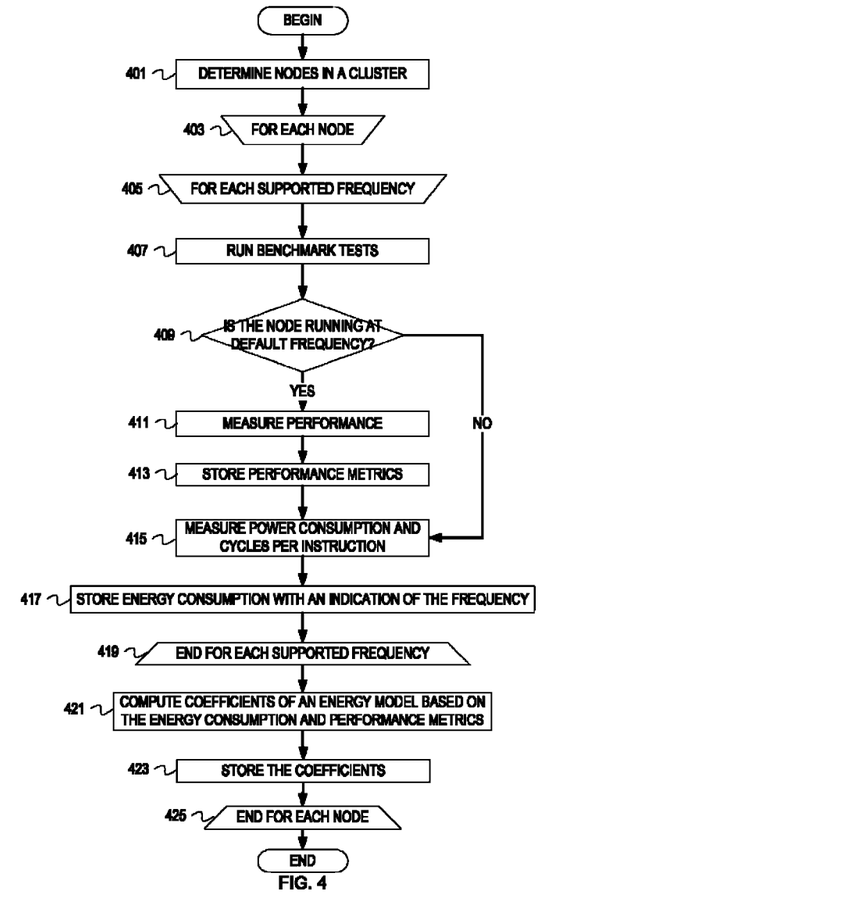
FIG. 4 is a flowchart depicting example operations for determining coefficients of a regression model.

The examples above refer to using estimated data and coefficients of energy models. Estimated energy usage data can be computed based on an energy usage regression model. Coefficients of the regression model can be determined when a cluster is configured. Energy usage and performance metrics can be measured while a set of benchmarks is run on nodes in the cluster. The coefficients can be determined based on the measured energy usage and performance metrics. FIG. 4 is a flowchart depicting example operations for determining coefficients of a regression model. Flow begins at block 401, where nodes in a cluster are determined. The nodes in the cluster can be determined during configuration of the cluster.

At block 403, a loop begins for each node.

At block 405, a loop begins for each supported frequency of the node.

At block 407, benchmark tests are run on the node. To run the benchmark tests, a job scheduler can indicate the benchmark tests (e.g., by providing references to the benchmark tests) and the frequency to a control process associated with the node. In response, the control process can initiate execution of the benchmark tests at the indicated processor core operating frequency. The benchmark tests can be based on application workloads defined in Standard Performance Evaluation Corporation (SPEC) CFP2006 benchmarks. The benchmark tests can be based on representative workloads (e.g., computation intensive, memory intensive, I/O intensive, etc.).

At block 409, it is determined if the node is running at default processor core operating frequency. Performance metrics can be measured at the default processor core operating frequency and can be different for different types of workloads (i.e., memory intensive versus computation intensive). The performance metrics measured during benchmark testing can be matched to measured performance metrics for a job the first time the job is performed so that energy usage and performance can be estimated with an appropriate model based on the job's workload (i.e., the job is matched to one of the benchmark tests that most closely resembles the workload of the job). If the node is running at default processor core operating frequency, flow continues at block 411. If the node is not running at default processor core operating frequency, flow continues at block 415.

At block 411, the node is running at default processor core operating frequency, so performance is measured. Examples of performance metrics include giga-instructions per second (GIPS), memory bandwidth in gigabytes per second (GBS), translation lookaside buffer (TLB) misses, cycles per instruction (CPI), completion time, etc.

At block 413, the performance metrics are stored. The performance metrics can be stored in a performance and energy usage database.

At block 415, power consumption and CPI are measured. The power consumption and CPI can be measured at all supported frequencies, less than all supported frequencies, randomly selected supported frequencies, preselected supported frequencies, etc. Power consumption can be measured by AEM. The power consumption can include power consumed by peripherals (e.g., cooling systems, storage devices, etc.) associated with the node. CPI can be determined based on an average number of cycles used for each instruction executed during the benchmark tests.

At block 417, the power consumption is stored with an indication of the frequency in the performance and energy usage database.

At block 419, the loop for each supported frequency ends.

At block 421, coefficients of the energy model are computed based on the power consumption and performance metrics. Coefficients can be computed for each supported frequency based on Expressions 1 and 3. In Expressions 1 and 3, the default processor core operating frequency is represented by n while 0 to n−1 represent supported frequencies below the default processor core operating frequency, where i=0, . . . , n. In Expression 1, p represents measured power consumption at each supported frequency, i. In Expression 3, $CPI_i$ represents measured cycles per instruction at each supported frequency, i. $TPI_n$ can be computed based on Expression 4. The coefficients are represented by a, b, c, d, and e. GIPS and GBS are performance metrics measured in block 413, and cache_line_size represents a size of cache lines in an instruction cache.

$$p_i = a_i \times GIPS + b_i \times GBS + c_i \qquad \text{Expression 1 (restated)}$$

$$CPI_i = d_i \times CPI_n + e_i \times TPI_n + f_i \qquad \text{Expression 3 (restated)}$$

$$TPI_n = \frac{GBS \times CPI_n}{\text{cache\_line\_size} \times f_n} \qquad \text{Expression 4 (restated)}$$

At block 423, the coefficients are stored. The coefficients can be stored with an indication of the performance metrics. When a job is performed, performance metrics can be measured and matched to performance metrics measured during benchmark testing in the performance and energy usage database so that appropriate coefficients can be located in the database and utilized when estimating performance and energy usage of the job.

At block 425, the loop for each node ends.

Embodiments are not limited to the example flowcharts depicted in the above figures. Embodiments can perform additional operations, fewer operations, operations in parallel, etc. For instance, referring to FIG. 4, the operations for running benchmark tests and measuring performance metrics and power consumption for each node can be run in parallel. In addition, operations can be performed to select energy usage and performance data for a previous run of a job and similar jobs. A job scheduler can use data from a previous run of the job at a first set of frequencies and data from similar previously run jobs at other supported frequencies. Operations can also be performed to compare data of different types of nodes, which support different frequencies, when selecting a node for job scheduling.

As will be appreciated by one skilled in the art, aspects of the present inventive subject matter may be embodied as a system, method or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
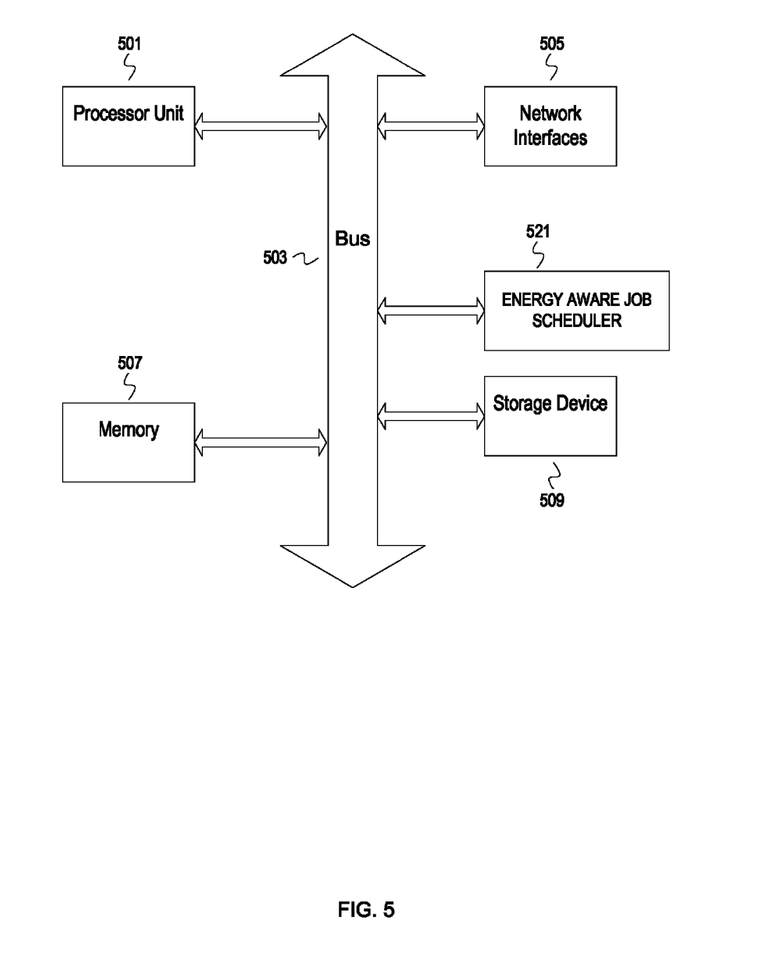
FIG. 5 depicts an example computer system with an energy aware job scheduler

FIG. 5 depicts an example computer system with an energy aware job scheduler. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI bus, ISA bus, PCI-Express bus, HyperTransport® bus, InfiniBand® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes an energy aware job scheduler 521. The energy aware job scheduler 521 analyzes energy usage and job performance data to select a processor core operating frequency to perform a job on a node in a cluster in accordance with a policy for the job. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. For instance, the above examples refer to determining whether a job or similar job has been previously performed in a cluster. Embodiments can, however, utilize energy and usage data for the job or a similar job performed in a different cluster or a node not within a cluster. Embodiments can access energy usage and job performance data independent of the cluster and utilize this data, perhaps based on node similarity, to perform the requested job. In general, techniques for energy-aware job scheduling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
accessing data that specifies energy usage and job performance metrics that correspond to a job and a plurality of processor core operating frequencies, wherein the job has been requested of a cluster;
selecting a first of the plurality of processor core operating frequencies that satisfies an energy usage criterion for performing the job based, at least in part, on the data that specifies the energy usage and the job performance metrics that correspond to the job;
determining coefficients of an energy model based on the job performance metrics and the energy usage;
estimating energy usage and the job performance metrics for the job at the first of the plurality of processor core operating frequencies based on the coefficients and the energy model;
storing the estimated energy usage and the job performance metrics for the job at the first of the plurality of processor core operating frequencies;
associating the stored estimated energy usage and the job performance metrics with the job and with the first of the plurality of processor core operating frequencies; and
assigning the job to be performed by a node in the cluster at the selected first of the plurality of processor core operating frequencies.

2. The method of claim 1 further comprising determining that the job or a similar job has previously been performed.

3. The method of claim 1, wherein the energy usage criterion for performing the job indicates at least one of a maximum amount of energy to be used to perform the job and an energy conservation goal.

4. The method of claim 1, wherein the plurality of processor core operating frequencies comprises a default processor core operating frequencies, and wherein the first of the plurality of processor core operating frequencies is lower than the default processor core operating frequency.

5. The method of claim 4, wherein said assigning the job to be performed by the node in the cluster at the first of the plurality of processor core operating frequencies comprises setting at least a first processor core of the node to run at the first of the plurality of processor core operating frequencies.

6. The method of claim 4 further comprising:
prior to said selecting the first of the plurality of processor core operating frequencies that satisfies the energy usage criterion for performing the job, collecting the energy usage and the job performance metrics for the job performed in the cluster at the default processor core operating frequency.

7. The method of claim 1 further comprising:
determining that a performance constraint is specified for the job;
wherein said selecting the first of the plurality of processor core operating frequencies that also satisfies the performance constraint.

8. The method of claim 1 further comprising:
measuring actual energy usage and performance metrics while the job is performed by the node at the first of the plurality of processor core operating frequencies; and
updating the data with the actual energy usage and performance metrics.

9. A computer program product for energy-aware job scheduling, the computer program product comprising:
a computer readable storage medium having computer readable program code embodied therewith, the computer readable program code comprising:
computer readable program code configured to,
access data that specifies energy usage and job performance metrics that correspond to a job and a plurality of processor core operating frequencies, wherein the job has been requested of a cluster;
select a first of the plurality of processor core operating frequencies that satisfies an energy usage criterion for performing the job based, at least in part, on the data that specifies the energy usage and the job performance metrics that correspond to the job;
determine coefficients of an energy model based on the job performance metrics and the energy usage;
estimate the energy usage and the job performance metrics for the job at the first of the plurality of processor core operating frequencies based on the coefficients and the energy model;
store the estimated energy usage and the job performance metrics for the job at the first of the plurality of processor core operating frequencies;
associate the stored estimated energy usage and the job performance metrics with the job and with the first of the plurality of processor core operating frequencies; and
assign the job to be performed by a node in the cluster at the selected first of the plurality of processor core operating frequencies.

10. The computer program product of claim 9, wherein the computer readable program code being configured to access the data comprises the computer readable program code being configured to determine that the job has previously been performed or that a similar job has been performed.

11. The computer program product of claim 9, wherein the plurality of processor core operating frequencies comprises a default processor core operating frequencies, and wherein the first of the plurality of processor core operating frequencies is lower than the default processor core operating frequency.

12. The computer program product of claim 11, wherein the computer readable program code being configured to assign the job to be performed by the node in the cluster at the first of the plurality of processor core operating frequencies comprises the computer readable program code being configured to set at least a first processor core of the node to run at the first of the plurality of processor core operating frequencies.

13. The computer program product of claim 11, wherein the computer readable program code is further configured to:
prior to said selecting the first of the plurality of processor core operating frequencies that satisfies the energy usage criterion for performing the job, collect the energy usage and the job performance metrics for the job performed in the cluster at the default processor core operating frequency.

14. The computer program product of claim 10, wherein the energy usage criterion for performing the job indicates at least one of a maximum amount of energy to be used to perform the job and an energy conservation goal.

15. An apparatus comprising:
a processor;
a network interface; and
a computer readable storage medium having computer usable program code embodied therewith, the computer usable program code executable by the processor to cause the apparatus to,
evaluate energy usage and job performance metrics against an energy usage criterion for a job, wherein the energy usage and the job performance metrics correspond to the job at different ones of a plurality of processor core operating frequencies of a node in a cluster;
select a first of the plurality of processor core operating frequencies based, at least in part, on evaluation of the energy usage and the job performance metrics against the energy usage criterion for the job;
determine coefficients of an energy model based on the job performance metrics and the energy usage;
estimate the energy usage and the job performance metrics for the job at the first of the plurality of processor core operating frequencies based on the coefficients and the energy model;
store the estimated energy usage and the job performance metrics for the job at the first of the plurality of processor core operating frequencies;
associate the stored estimated energy usage and the job performance metrics with the job and with the first of the plurality of processor core operating frequencies; and
assign the job to the node for performing the job at the first of the plurality of processor core operating frequencies.

16. The apparatus of claim 15, wherein the computer usable program code is further executable by the processor to cause the apparatus to determine that the job or a similar job has previously been performed.

17. The apparatus of claim 15, wherein the computer usable program code being executable by the processor to cause the apparatus to assign the job to the node for performing the job at the first of the plurality of processor core operating frequencies comprises computer usable program code executable by the processor to cause the apparatus to to set a core of the node to run at the first of the plurality of processor core operating frequencies.

18. The apparatus of claim 15, wherein the energy usage criterion indicates at least one of a maximum amount of energy to be used to perform the job and an energy conservation goal.

* * * * *